(12) United States Patent
Kappler et al.

(10) Patent No.: US 6,876,952 B1
(45) Date of Patent: Apr. 5, 2005

(54) METHODS AND APPARATUS FOR MAINTAINING QUEUES

(75) Inventors: Christopher J. Kappler, Waltham, MA (US); Gregory S. Goss, Dunstable, MA (US); Scott C. Smith, Mansfield, MA (US); Achot Matevossian, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

(21) Appl. No.: 10/426,438

(22) Filed: Apr. 30, 2003

(51) Int. Cl.[7] ............................................. G06F 11/00
(52) U.S. Cl. ...................... 702/187; 702/187; 702/176; 702/79; 370/218; 370/394; 709/201; 709/217; 710/25; 710/58; 710/61; 379/266.04; 719/314
(58) Field of Search ........................... 702/57, 79, 176, 702/177, 187.1, 89; 370/218, 394; 709/201, 217; 710/25, 58, 61; 379/266.04; 719/314

(56) References Cited

U.S. PATENT DOCUMENTS

| | | | |
|---|---|---|---|
| 5,828,881 A | * 10/1998 | Wang ......................... | 719/314 |
| 6,064,677 A | * 5/2000 | Kappler et al. ......... | 370/395.43 |
| 6,522,188 B1 | 2/2003 | Poole ......................... | 327/407 |
| 6,600,741 B1 | 7/2003 | Chrin et al. ................. | 370/375 |
| 6,628,610 B1 | 9/2003 | Waclawsky et al. ........ | 370/229 |
| 6,643,260 B1 | 11/2003 | Kloth et al. ................. | 370/235 |
| 6,658,007 B1 | 12/2003 | Pasternak et al. ......... | 370/395.4 |
| 6,681,261 B2 | 1/2004 | Mancusi et al. ............. | 709/250 |
| 6,687,247 B1 | 2/2004 | Wilford et al. ............. | 370/392 |
| 6,714,553 B1 | 3/2004 | Poole et al. ................. | 370/412 |
| 6,724,721 B1 | 4/2004 | Cheriton ..................... | 370/229 |
| 6,798,746 B1 | 9/2004 | Kloth et al. ................. | 370/235 |

OTHER PUBLICATIONS

Burns et al., 'Effective Analysis for Engineering Real–time Fixed Priority Schedulers', IEEE Article, May 1995, pp. 475–480.*
Williams, 'Queuing', University of Mexico, Jan. 2002, pp. 1–10.*
Chao et al., 'Designing of Packet–Fair Queuing Schedulers Using a RAM–Based Searching Engine', Jun. 1999, IEEE Article, vol. 17, No. 6, pp. 1105–1126.*
Tyan et al., 'A Rate–Based Message Scheduling Paradigm', IEEE Article, Jan. 1999, pp. 203–215.*

* cited by examiner

*Primary Examiner*—Marc S. Hoff
*Assistant Examiner*—Elias Desta
(74) *Attorney, Agent, or Firm*—Chapin & Huang, L.L.C.; David E. Huang, Esq.

(57) ABSTRACT

One or more queues store data information such as packets or data flows for later transmission to downstream communication devices. A real-time clock tracks current time and an advancement of a moving time reference, which is displaced with respect to the current time of the clock by an offset value. Thus, as current time advances, the moving time reference also advances in time. Upon servicing a queue, a time stamp associated with the serviced queue is also advanced in time. To monitor a rate of outputting data from the one or more queues, a processor device at least occasionally adjusts the offset value so that the moving time reference and values of the time stamps advance in relation to each other. Consequently, by tracking a relative time difference between current time of the real-time clock and a relative advancement of time stamps, a rate of outputting data information from the queue is monitored over time.

29 Claims, 6 Drawing Sheets

METHODS AND APPARATUS FOR MAINTAINING QUEUES

BACKGROUND OF THE INVENTION

In general, schedulers are used to manage allocation of system resources. When employed in router applications, schedulers manage many queues and ensure overall fairness of outputting data packets from the queues by selectively servicing each of the queues at different times.

Both virtual-time schedulers and real-time schedulers can be used to schedule servicing of output queues in a router device. Virtual-time schedulers maintain a relative ordering of scheduling queues for servicing, but do not track the passage of real time. Real-time schedulers, on the other hand, track the passage of real time and utilize time stamp information associated with each data packet to schedule transmission of packets so that data packets are output from the queues at a specified rate. Congestion in the queues can occur if they are not serviced at a proper rate.

SUMMARY

Unfortunately, there are deficiencies associated with real-time schedulers. Real-time schedulers generally can't tolerate over-commitment of resources. For example, when bandwidth is committed to transmitting data packets other than those temporarily stored in queues, the queues can become congested with excess data packets because they are not being serviced at a proper rate. More specifically, one form of congestion occurs when non-rate packet flows (miscellaneous overhead data packets) are given priority over regular data flows stored in the queues. When the non-rate packets are transmitted in lieu of outputting data from the queues, the queues can become congested because they are serviced less often.

Another deficiency of real-time schedulers is the method they use to manage time stamps. In an extreme case, real-time schedulers utilize time stamps associated with each packet to determine when it shall be scheduled for transmission in real-time. Processing and storage of these time stamps consumes considerable system resources.

There are also deficiencies associated with virtual time schedulers. Virtual time stamps have no relation to real-time. As a result, virtual time stamps are never compared to a real-time counter to determine an order for servicing. Because virtual-time schedulers service queues based on relative ordering, servicing of queues based on virtual time stamps does not inherently provide a sense of whether the queues are serviced often enough to output data information at an expected rate. Consequently, it is not guaranteed that a queue is being serviced at a proper rate for outputting data.

One aspect of the present invention involves monitoring the output of one or more queues using a simple monitoring circuit. A real-time clock tracks current time. As queues are serviced by outputting data, corresponding time stamps associated with the queues are incremented and thus advance in time. When the queues are serviced at a proper rate, values of the time stamps generally advance at a same rate as current time. Thus, changes in the displacement between current time and values of the updated time stamps indicate whether the queues are being over-serviced or under-serviced.

More specifically, a processor device tracks a time reference that is displaced with respect to the current time of the clock by an offset value. The time reference advances with respect to current time and is thus itself a moving time reference. Upon servicing the queues, time stamps associated with the serviced queues are also incremented. As the time stamps advance in time, the processor device adjusts the offset value so that the moving time reference and values of the time stamps advance in relation to each other. Changes in the offset value indicate whether the queues are being properly serviced over time.

This technique of monitoring output rates of data from a queue can be used to detect congestion. For example, as the offset value increases, it is known that the rate of outputting data from the queue is slower than an expected rate of outputting data. Conversely, as the offset value decreases, it is known that a particular queue is outputting data at a faster than expected rate of outputting data.

Each queue has an associated time stamp that indicates a relative time for servicing the queue with respect to a clock that tracks current time. As a queue is serviced, a certain amount of its data is output from the queue. After servicing a queue, the time stamp of the queue is incremented (or advanced) to indicate a next relative time for updating the queue. As the queue is properly serviced over time, the time stamps associated with the queues will be incremented at the same rate as the real-time clock and the offset value generally will remain constant over time.

The time stamps associated with multiple queues can be compared to each other to determine an order for servicing the queues. For example, higher and lower values of the time stamps indicate a relative order for servicing the queues. The queue with the oldest time stamp indicates the next queue for servicing. This technique of tracking a single time stamp for each queue is simpler than tracking time stamps for each data packet in the queues as employed in conventional methods.

In one application, each queue is expected to output data at a particular rate. The processor device services the corresponding queues often enough so that the amount of data output from the queue or collective queues does not fall below the expected rate or rates. The time stamp associated with each queue is updated based on the expected rate of outputting data from the queue and an amount of data output from the queue as a result of servicing. For example, the time stamp associated with a queue is updated by adding to the present time stamp, the expected rate of outputting data from the queue divided by the amount of data outputted from the queue at a time of servicing. This operation can be represented by the following equation:

$$\text{new Tstamp} = \text{previous Tstamp} + (\text{amount of output data})/(\text{expected rate of queue})$$

In this way, the time stamp associated with a queue is incremented each time the corresponding queue is serviced so that the time stamp advances in time.

Generally, the time stamps indicate a relative time (with respect to a real-time clock) for servicing the queue. Because the time stamps are incremented in relation to an amount of data output at a time of servicing the queue and an expected rate of outputting data from the queue, increasingly larger time differences between current time and values of the oldest time stamps indicates that the queue or queues are not being serviced often enough to maintain the specified rate of outputting data from a queue.

In one application, at a time of servicing a queue, the corresponding time stamp of the queue is compared to the moving time reference, which is equal to current time minus the previous offset value. If the time stamp (associated with the serviced queue) is outside a range with respect to the moving reference at an instantaneous time of servicing the queue, the offset value is updated so that the moving time reference coincides with the time stamp. Thus, if the offset value is approximately equal to a time difference between the current time and the corresponding time stamp, the offset value is not updated to a new value. This ensures that, over time, the offset value is not needlessly updated unless there is a significant change in the time difference between current time and updated time stamps of serviced queues.

Another aspect of the present invention involves monitoring a performance of servicing multiple queues that temporarily store data information. A monitoring circuit includes a real-time clock, a memory device, a scheduler, and a processor. The real-time clock keeps track of current time. The memory device stores an offset value indicating a relative offset in time of a moving time range with respect to present time of the real-time clock. The scheduler maintains time stamp information (or virtual schedule information) associated with the queues and advances values of the time stamps as they are serviced by outputting data. An ordering circuit associated with the scheduler compares values of the time stamps to identify a relative order for servicing the queues. In response to determining a queue having an oldest associated time stamp, the processor device services the queue by outputting data. At a time of servicing a selected queue, the processor device generates at least one comparison result based on a comparison of a time stamp associated with a queue selected for servicing and the moving time range. Based on the comparison result, the processor adjusts the offset value if the time stamp associated with the selected queue falls outside the moving time range.

In one application, the processor services queues having time stamps that fall within the moving range at a snapshot in time. Such queues are then serviced in a relatively short period of time. If an oldest time stamp associated with the queues does not fall within the moving time range at the snapshot in time, the time range is adjusted so that it includes the oldest time stamp.

Enforcing a peak rate of outputting data from the queues is achieved by adjusting the moving time range so that it does not advance in time faster than the real-time clock. In this instance, the queues are serviced at or below a specified rate so that the output of data from the queues is limited to the peak rate.

The aforementioned techniques to monitor the output of one or more queues are preferable over the use of conventional techniques. Note that monitoring an output from even a single queue can be difficult. In certain applications, thousands of queues are managed, thus rendering it proportionally more difficult to monitor servicing of queues over time. The simple monitoring circuit tracks a relative output from multiple queues based on tracking a single time stamp for each queue. Comparatively, both virtual time schedulers and real time schedulers offer only a subset of these features. Virtual time schedulers are unable to measure or observe the over-servicing or under-servicing of queues. Real time schedulers are unable to tolerate over-commitment without negative implementation effects.

The time stamps used in determining order of servicing queues have a dual purpose. For example, one purpose of the time stamps is to identify a most delinquent queue. The other purpose of the time stamps is to update the offset value, which in turn is used to evaluate a rate of outputting data from the queues. This technique of leveraging use of the use of time stamps to monitor performance of the queues reduces overall circuit complexity.

Monitoring and managing a throughput of one or multiple queues is beneficial to both users whose data is temporarily stored in the queues and other users that share the use of a network. Consider a situation in which throughput of a queue or queues is unexpectedly reduced. Certain data stored in the queues may be discarded or delayed at the dismay of a user trying to transmit a data packet to a destination node. Thus, if queues are mismanaged by not properly outputting data at a specified rate, users may attempt to re-transmit such data, producing additional traffic on an already busy network.

DETAILED DESCRIPTION

Networking devices such as routers sometimes implement thousands of data queues to temporarily store data packets for later transmission to intended targets. In such applications, data information is initially stored in a selected queue before it is eventually retransmitted from an output port of the router to the appropriate destination. As a result of ever-increasing demand for bandwidth (e.g., Internet access) and simultaneous sharing of routers, queues in the routers can be inundated with an excessive inflow of data. On the back end of the router, the one or more queues can become "congested" as a result of a reduced outflow of data packets stored in the queues. If the queues are not serviced on a regular basis, clients can not be guaranteed at least a minimal rate of transferring data through a router.

As discussed, one aspect of the present invention involves monitoring the output of one or more queues using a monitor circuit. A real-time clock tracks the advancement of current time. Time stamps associated with the queues are updated each time the queues are serviced by outputting data. When the queues are serviced at a proper rate, values of the time stamps generally advance at a same rate as current time. However, when the queues are over-serviced or under-serviced, the displacement between current time and values of the updated time stamps respectively decreases or increases.

Figure 1:
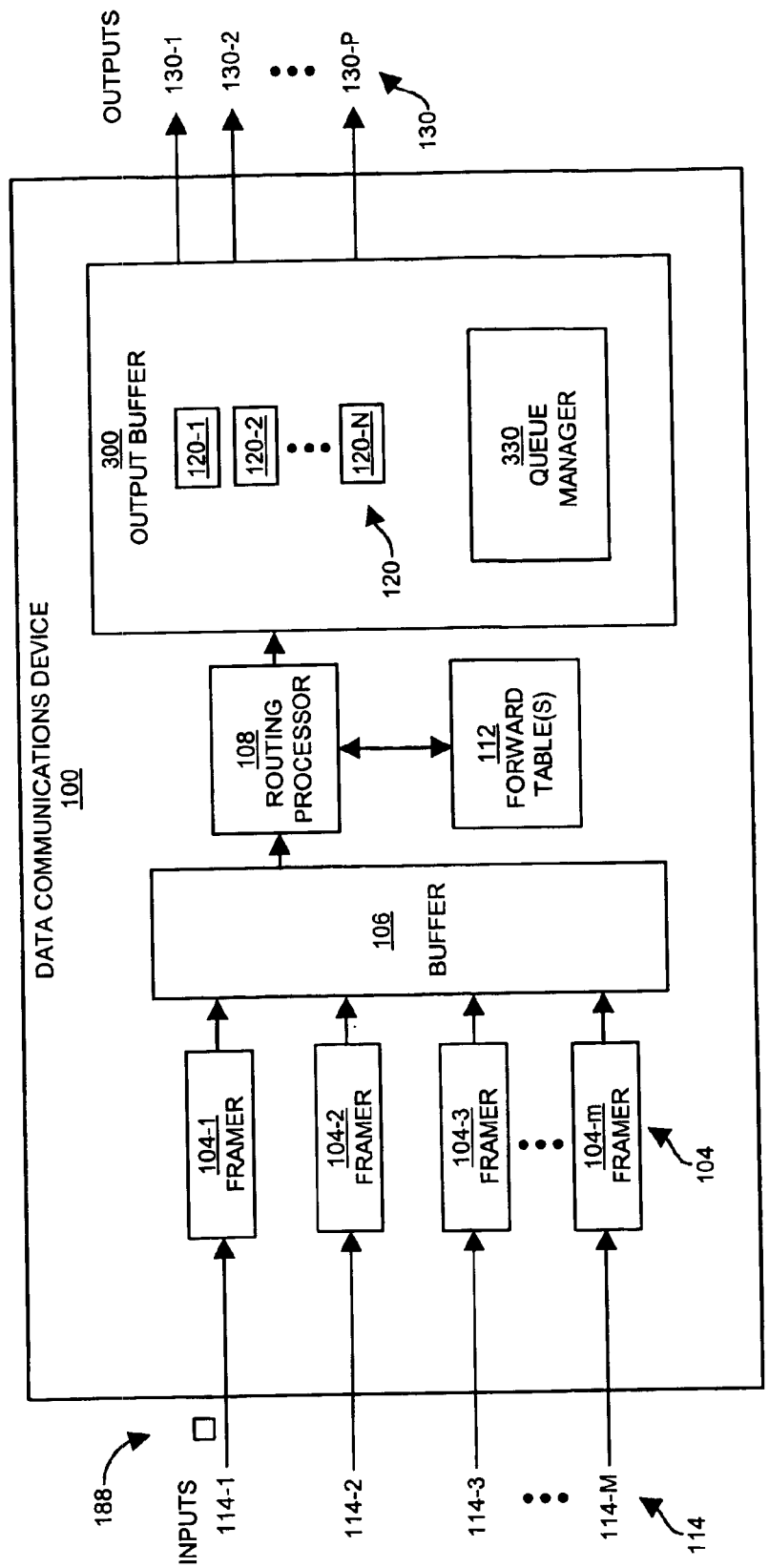
FIG. 1 is a block diagram of a data communications device for processing an inflow and outflow of data information.

Although the techniques described herein can be used in networking applications, and particularly to monitoring an output of data information from one or multiple queues, the techniques are also well-suited for other applications that employ queues to temporarily store data information. For example, the techniques disclosed herein are well-suited for use in hierarchical systems in which bandwidth services are granted to hierarchical scheduling nodes. FIG. 1 is a block diagram of data communications device 100 including queue manager 330 that monitors an output of data packets 188 stored in queues 120 (such as logical or physical queues). As shown, communications device 100 includes framers 104-1, 104-2, ..., 104-m (collectively, framers 104), buffer 106, routing processor 108, forward tables 112, and output buffer 300. Output buffer 300 includes queues 120-1, 120-2, ..., 120-n (collectively, queues 120), and queue manager 330.

In the context of a router or networking device, data information such as TCP/IP (Transmission Control Protocol/Internet Protocol) packets 188 are received on inputs 114-1, 114-2, ..., 114-m (collectively, inputs 114) of data communications device 100. Typically, in this context, inputs 114 and outputs 130 are hardwired electronic cables and/or optical fibers of a communication network.

The data information received at inputs 114-1, 114-2, ..., 114-m is processed via corresponding framers 104-1, 104-2, ..., 104-m into frames of binary encoded information. In one application, framers 104 process incoming data by stripping excess information in a packet down to its data payload intended for a target.

Based on a type of received data information, framers 104 classify packets 188 and store them in buffer 106.

Routing processor 108 utilizes forward tables 112 to repackage the data packets 188 stored in buffer 106 to include address information for appropriate transmission to an intended downstream target.

To address situations of high traffic, data communications device 100 is configurable to drop data packets 188 according to a policing function.

In accordance with the techniques as previously discussed, the repackaged data packets 188 are temporarily stored in potentially one of tens of thousands of queues 120 for later transmission on outputs 130-1, 130-2, ..., 130-p (collectively, outputs 130). Among other tasks, one purpose of queue manager 330 is to monitor the output or throughput of data though queues 120. The technique of tracking data information through the queues can be cumbersome simply because of the potentially large number of queues 120 that needs to be monitored.

Each of multiple queues 120 are filled with new data for transmission to intended downstream communications devices. At times, queues 120 are serviced by outputting data from a selected queue and transmitting it on output 130. In one application, queues 120 are FIFO (First-In-First-Out) memory devices. Any suitable memory device such as RAM (Random Access Memory), SRAM (Static RAM), FIFO, registers, and combinatorial logic can be used to fabricate queues 120.

It should be noted that data communications device 100 optionally supports either or both connection-oriented routing and packet-switched routing (connectionless routing). In connection-oriented routing, related packets 188 are transmitted along an established common connection path. In packet-switched routing, small units of data information are relayed through nodes of a computer network along the best available route between a source node and destination node.

Figure 2:
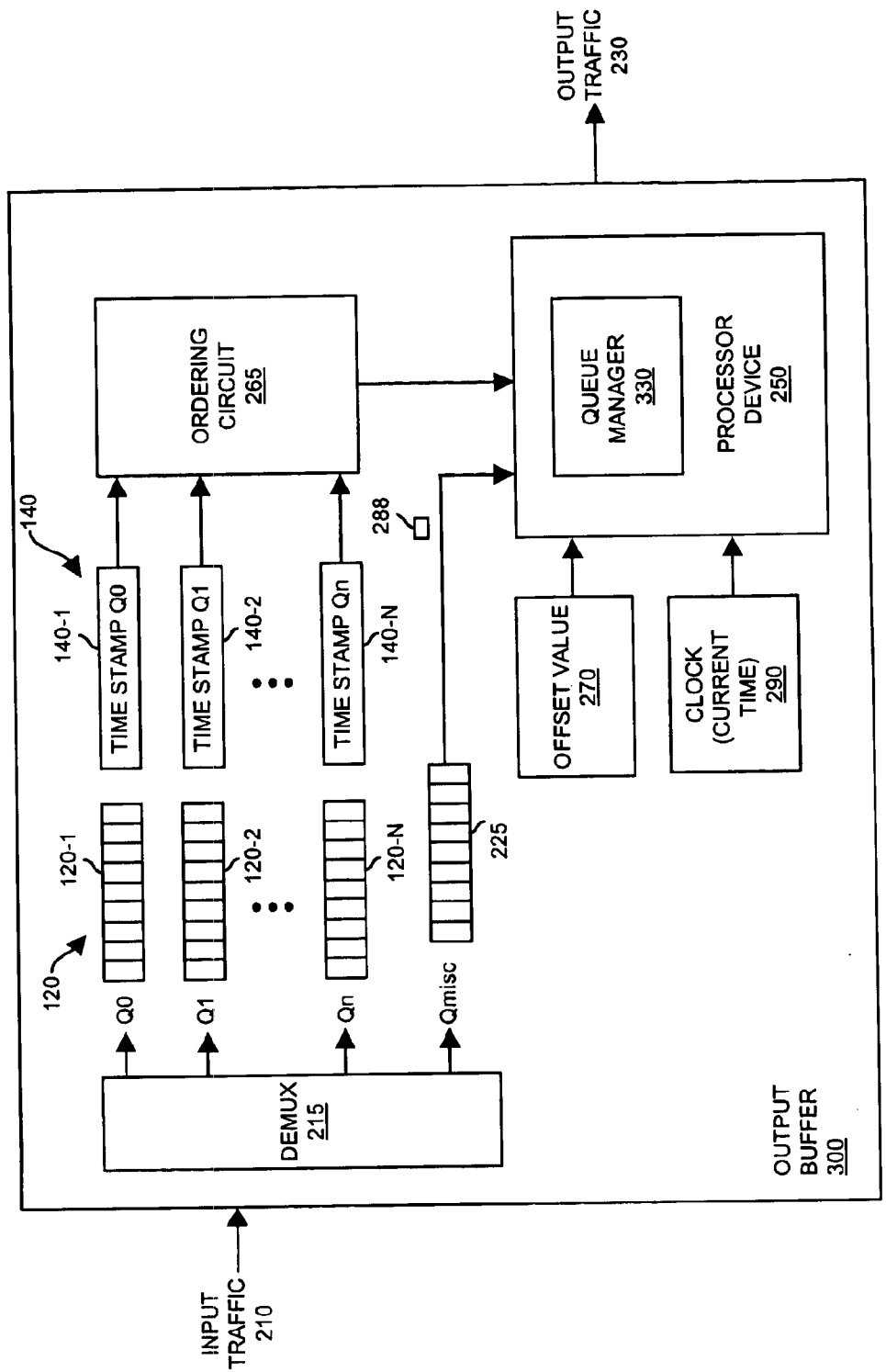
FIG. 2 is a detailed block diagram of an output buffer including one or more queues for queuing data.

FIG. 2 is a detailed block diagram of output buffer 300 of communications device 100. As shown, output buffer 300 includes demultiplexer 215, queues 120-1, 120-2, ..., 120-n (also labeled Q0, Q1, ... Qn, respectively), corresponding time stamps 140-1, 140-2, ..., 140-n (collectively, timestamps 140), miscellaneous queue 225, ordering circuit 265, processor device 250, queue manager 330, offset value 270, and clock 290.

Generally, input traffic 210 such as data packets 188 are stored in queues 120. Upon receipt of input traffic 210, demultiplexer 215 selects which of multiple queues 120 and miscellaneous queue 225 to temporarily store each data packet.

In one application, the choice of which queue 120 to store a data packet depends on a QoS (Quality of Service) associated with the data packet. More specifically, data communications device 100 may be required to store data in a queue 120 that enables an intended target destination to receive the data within a particular amount of time associated with the Qos class of the data (i.e., within a particular delay bound).

Certain queues 120 are expected to output data at a particular data rate. For example, Q0 is optionally set to have an expected rate of outputting 10 megabits of data information every second. In a similar way, Q1 may be assigned to support an expected output rate of 4 megabits of data information every second, and so on. Each queue can be assigned a different rate or same expected output rate for outputting data.

Each queue 120 has an associated time stamp 140 indicating a relative ordering for servicing the queue 120. For example, time stamp 140-1 tracks a next relative scheduled time for servicing queue 120-1, time stamp 140-2 tracks a next scheduled relative time for servicing queue 120-2, and so on.

Ordering circuit 265 compares time stamps 140 associated with multiple queues 120 to determine which queue 120 shall be serviced next by outputting some of its data. In one application, an oldest time stamp 140 of the queues 120 identifies a next particular queue that is next in order for servicing.

Processor device 250 and, more specifically, queue manager 330 performs the task of controlling the flow of output traffic 230. Output traffic 230 includes a mix of data packets 188 output from queues 120 and miscellaneous queue 225. The miscellaneous data packets 288 can include overhead packets generated by communications device 100 and other high priority data packets that are transmitted regardless of a fullness of queues 120.

When queue manager 330 outputs relatively large amounts of miscellaneous data packets 288 from miscellaneous queue 225, less data packets 188 are output from queues 120. Consequently, queues 120 can become "congested" with excess data if they are not serviced often enough by queue manager 330. This is unacceptable if a particular queue 120 or data flow associated with a client is guaranteed a particular throughput rate.

Queue manager 330 monitors queues 120 to determine whether they output data at a specified rate. To achieve this end, offset value 270 is generally set equal to an offset in time between current time and the value of time stamps 140 at a time of servicing the queues 120. As queues 120 are updated, the corresponding time stamps 140 advance in time. Current time of real-time clock 290 also advances in time. As long as offset value 270 (measuring a time difference or displacement between the updated time stamps and present time) is constant, it is known that queues 120 are being serviced reasonably often so that they are not congested with data. Upon servicing a particular queue 120, the time stamp 140 for the queue 120 is updated. When queues 120 are not serviced at an appropriate time, as measured by a difference between the current time of real-time clock 290 and corresponding time stamp 140, a value of offset value 270 is increased or decreased accordingly. An increasing offset value can indicate that queues 120 are under-serviced while a decreasing offset value can indicate that queues 120 are over-serviced. Appropriate action such as servicing queues 120 can be taken to correct either of these conditions.

In one application, processor device 250 (and queue manager 330) is a microprocessor executing a set of instructions to update offset value 270 and thus monitor a status of outputting data from queues 120. Alternatively, processor device 250 and queue manager 330 are employed as a logic circuit in an ASIC device (Application Specific Integrated Circuit) such as an FPGA (Field Programmable Gate Array). In yet another application, the monitoring circuit is made from other suitable discrete circuit components.

Figure 3:
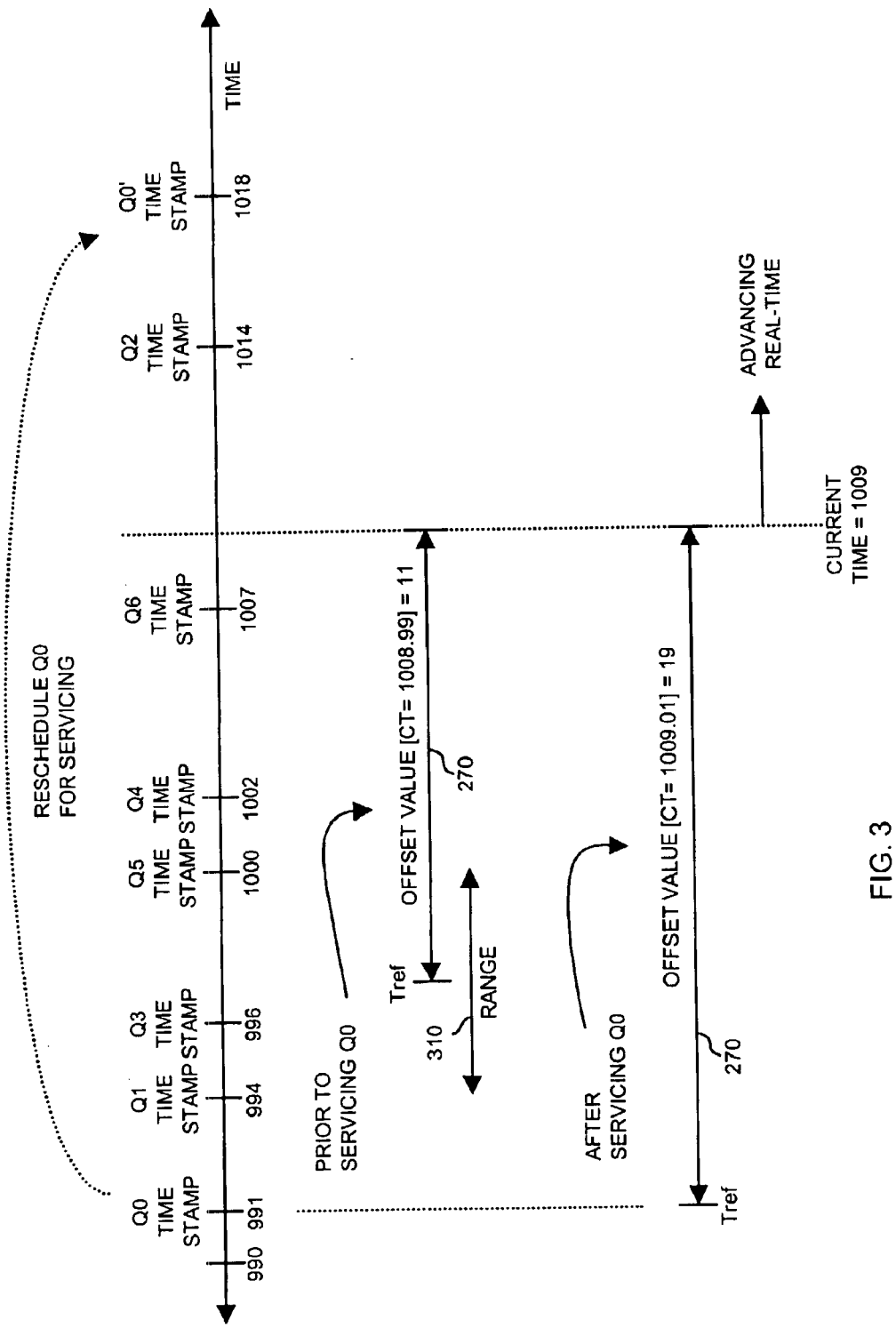
FIG. 3 is a timing diagram illustrating a technique of maintaining and monitoring one or more queues.

FIG. 3 graphically illustrates the technique of servicing queues 120 and updating corresponding time stamps 140. As shown, each of queues 120 has an associated time stamp 140 identifying an expected relative scheduled time for next servicing the queue 120. As mentioned, the oldest time stamp 140 identifies the next queue 120 for servicing.

In the instance shown, Q0 (queue 120-1) is the oldest associated time stamp 140 and is thus next in line for servicing. A value of the time stamp Q0 is 991. Clock 290 can be a counter or some other device that keeps track of current time. For illustrative purposes, assume that values of the time stamps 140 are tracked in microseconds.

Offset value 270 is updated each time a queue 120 is serviced by outputting data. However, since processor device 250 does not necessarily devote all of its time to servicing queues 120, moving time reference, Tref, sometimes advances along with current time so that a time stamp of a next serviced queue is out of range 310 with respect to Tref. As discussed, queue manager 330 may attend to outputting a burst of high priority traffic from miscellaneous queue 225. As a result of not servicing queues 120, queues 120 can become congested with data. Additionally, a queue 120 can become congested as a result of a source generating too many data packets. More specifically, a source generating data packets higher than a specified rate assigned to the data flow can cause a queue 120 to become congested.

Suppose that a last time of servicing a queue 120 (prior to servicing Q0 as shown) occurred at time 1001 and a value of the time stamp 140 of the last serviced queue was 990. At the time of this previous servicing, offset value 270 was set equal to 11 by way of example.

As shown, since last servicing queues 120 at time=1001, Tref has advanced in relation along with real-time system clock 290. Thus, just prior to servicing Q0 (the next queue for servicing), Tref does not coincide with a value of time stamp Q0. Upon servicing Q0 by outputting data, offset value 270 is updated so that Tref coincides with a value of time stamp Q0 when Q0 is serviced. More specifically, Tref is updated so that moving time reference aligns with time stamp Q0 at the instant in time of servicing Q0. This is shown by setting offset value 270 equal to 19.

The technique of updating the offset value 270 and moving time reference Tref can vary depending on the application. In one application, offset value 270 is only updated if the time stamp 140 of the queue 120 being serviced falls outside range 310 with respect to moving time reference Tref Alternatively, and as previously discussed, offset value 270 can be successively updated so that Tref coincides with a corresponding time stamp of the queue 120 every time it is serviced.

In the instance shown, offset value 270 is updated to equal 19 at or around of time of servicing Q0. Generally, offset value 270 is set equal to current time less a value of the time stamp 140 associated with the queue 120 being serviced. The increase in offset value 270 from 11 to 19 indicates that the current time is advancing faster than queues 120 are being serviced.

After a queue 120 is serviced, a corresponding time stamp 140 associated with the queue 120 is advanced or updated to a new value. For example, as shown in FIG. 3, the time stamp 140 associated with servicing of Q0 is incremented to a next relative scheduled time for servicing.

In one application, time stamps 140 are advanced depending on an amount of data output from a corresponding queue 120 at a time of servicing. For example, a time stamp 140 associated with a serviced queue 120 is advanced based on the following equation:

$$Q0'(\text{time stamp}) = Q0(\text{time stamp}) + \frac{(\text{amount output data})}{(\text{expected rate of } Q0)} \quad (\text{Eq. 1})$$

Assume that a size of the data packet output from Q0 at CT=1009 (e.g., current time=1009) is 256 bits. Given that the expected output rate of Q0 is 10 megabits/second, the time stamp 140 associated with Q0 is advanced by a time equal to $$\frac{256}{10 \text{MB/s}} \text{ or } 27$$

microseconds. Thus, the next scheduled time for servicing Q0 is 991+27=1018.

This technique of updating time stamps 140 of queues 120 makes it easy to identify when a particular queue or a set of queues 120 are not outputting data at a specified rate since a rate of advancing or incrementing time stamps 140 should equal a relative advancement of current time. When queues 120 are serviced at a slower or higher rate than expected, offset value 270 will respectively increase or decrease.

More specifically, as the queues 120 are serviced less and less often, offset value 270 will increase indicating that values of the time stamps 140 do not advance at a same rate as current time. Conversely, as queues 120 are serviced more often, values of time stamps 140 will advance more quickly with respect to current time and offset value 270 will decrease. If offset value 270 does not change over time, it can be deduced that data is output from queues 120 at their respective expected output rates.

In one application, queues 120 are not serviced unless the corresponding time stamps 140 associated with queues 120 lag behind the current time of clock 290. This provides peak rate limits for outputting data from queues 120.

Queue manager 330 can monitor offset value 270 to determine whether queues 120 are being serviced so that data is output from queues 120 at their respective rates. A notification signal can indicate that offset value 270 has increased and that queue manager 330 should devote additional processor time to service queues 120. Consequently, queue manager 330 can catch up on servicing queues 120 so that offset value 270 is reduced.

On average, even though offset value 270 may fluctuate over time, queues 120 will support outputs at their specified expected rates if values of the time stamps advance at the same rate as current time.

Figure 4:
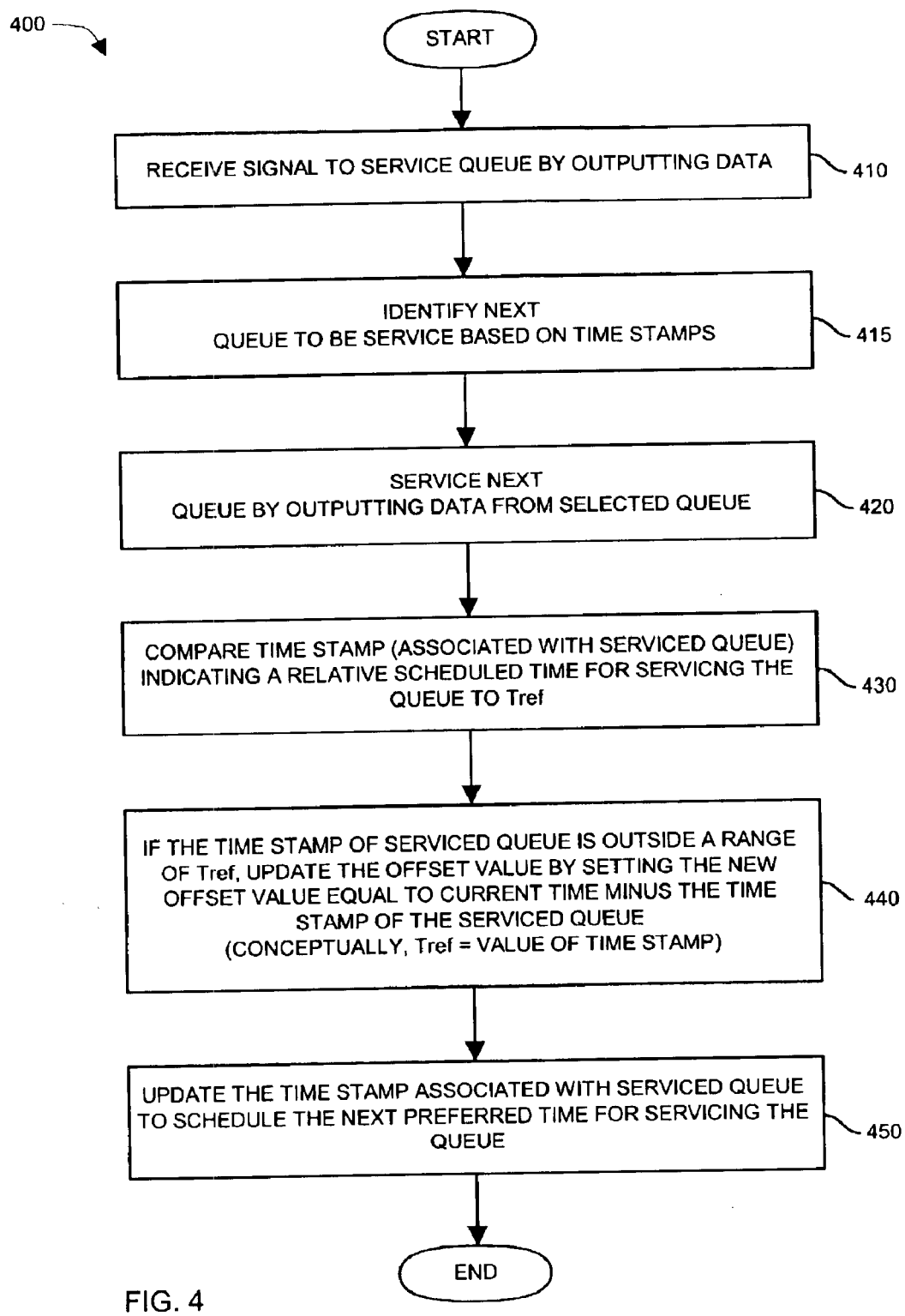
FIG. 4 is a flowchart illustrating a method of maintaining and monitoring an output of data information from one or more queues as depicted in FIG. 3.

FIG. 4 is a flowchart 400 illustrating a technique of monitoring and maintaining one or multiple queues 120.

In step 410, queue manager 330 receives a signal to service queues 120 by outputting their data. Such a signal can be periodically received so that queues 120 are serviced at least at a minimal rate. Alternatively, a notification signal can be generated in response to detecting that offset value 270 has increased.

In step 415, the next queue 120 for servicing in a set of queues 120 is identified by comparing values of time stamps 140. The oldest time stamp 140 indicates the associated queue 120 that is next in line for servicing.

In step 420, the selected next in line queue is serviced by outputting data. In step 430, a value of the time stamp 140 associated with the next queue 120 for servicing is compared to moving time reference, Tref, at a time of servicing such a queue 120.

In step 440, if the time stamp is outside a specified range with respect to Tref at the instant in time of servicing the selected next queue 120 for servicing, offset value 270 is updated so that Tref coincides with a value of a time stamp 140 associated with the serviced queue 120. This involves setting offset value 270 equal to a present value of current time minus the value of the corresponding time stamp 140.

In step 450, the time stamp 140 of the serviced queue 120 is advanced to a next preferred relative time for servicing the queue 120. The amount of advancing the time stamp 140 depends on an expected output rate of outputting data from queue 120 and amount of data actually output from the queue 120 as a result of servicing.

Figure 5:
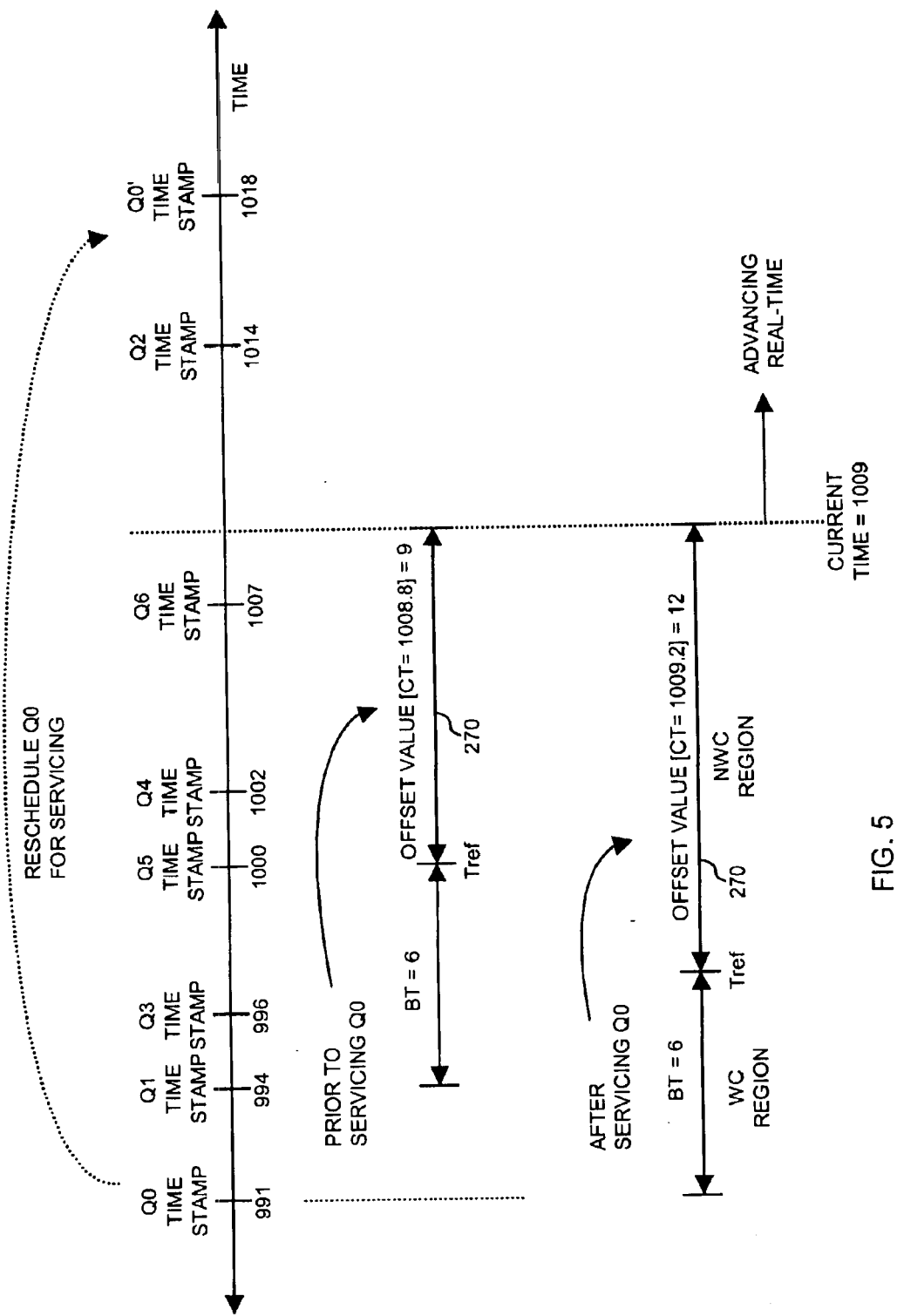
FIG. 5 is a timing diagram illustrating another technique of maintaining and monitoring one or more queues.

FIG. 5 is a timing diagram illustrating how moving time reference, Tref, is used to limit a rate of outputting data from one or more queues 120. Servicing of queues 120 is limited so that offset value 270 does not decrease over time. In this instance, since offset value 270 only increases or stays the same over a course of servicing queues 120, it is known that an output of any of the queues 120 never exceeds a particular peak rate of outputting data.

Similar to the technique as previously discussed, a value of time stamps 140 associated with queues 120 indicate an order for servicing the queues 120. For example, time stamp 140 for Q0 is the oldest time stamp and, thus Q0 is the next queue 120 to be serviced.

In the illustrative example of FIG. 5, queue manager 330 does not service queues 120 for some time (at least 9 units of time as shown) prior to servicing Q0. Hence, a moving time range of width BT advances along with current time, but lags by offset value 270. When queue manager 330 services queues 120 at a snapshot in time when current time=1009, a relative positioning of the moving time range BT with respect to current time is adjusted.

In this embodiment, as shown, offset value 270 is adjusted or increased just enough so that moving time reference, Tref, is within a Burst Tolerance (BT) range of the oldest time stamp 140 corresponding to the next queue 120 (in this case, Q0) to be serviced. In other words, offset value 270 is set equal to current time minus Q0 time stamp minus a value of range BT.

As shown, upon servicing Q0 by outputting data, Q0 time stamp is rescheduled in relative time for future servicing. In this way, the time stamps 140 are advanced or incremented depending on an expected rate of outputting data and an amount of data output from the queue 120 at a time of servicing.

If, at the time of servicing, time stamp 140 associated with the next queue 120 to be serviced happens to fall within range BT, offset value 270 is not adjusted. In other words, offset value 270 is adjusted or increased only if a time stamp 140 of a next queue 120 to be serviced lags behind moving time range BT.

Referring again to the example shown in FIG. 5, after updating Tref to an instantaneous value of 997 by setting offset value 270 equal to 12, queue manager 330 optionally services Q0 (if not yet serviced), Q1 and Q3. Consequently, output buffer 300 can generate a relatively high level of output traffic 230 in a short period of time when processor device 250 and, more specifically, queue manager 330 services multiple queues 120 in the burst tolerance range BT. As mentioned, queues 120 having associated time stamps 140 ahead of Tref are not serviced. Such queues 120 will be serviced after Tref sufficiently advances in time so that Tref is ahead of the corresponding time stamps.

In one application, queue manager 330 services queues 120 at a reduced rate so that the moving time reference Tref (or moving time range BT), never gets nearer to current time each time the queues are updated. In other words, the queues are serviced infrequently so that moving time reference, Tref, either increasingly lags current time or tracks behind current time by a non-changing offset value 270. This ensures that an output of data from queues 120 never exceeds a peak rate. Note that time stamps 140 associated with serviced queues 120 are advanced in time depending on a selected rate of outputting data and an amount of data output from a queue 120. If offset value 270 only increases or stays the same over a course of servicing queues 120, it is known that an output of any of the queues 120 never exceeds a particular peak rate of outputting data. This technique of controlling how many and when queues 120 are serviced limits a rate of outputting data from the one queue or multiple queues.

Generally, use of time stamps 140 enable queue manager 330 to operate as a virtual-time scheduler in which queues 120 are serviced in relative order. The technique of maintaining and adjusting offset value 270 adds a real-time aspect to the virtual-time scheduler. For example, as previously discussed, a relative output rate of data from multiple queues 120 can be monitored or controlled based on offset value 270. Adjustments to the burst tolerance range controls the number of queues 120 that are serviced at an instant in or window of time.

Figure 6:
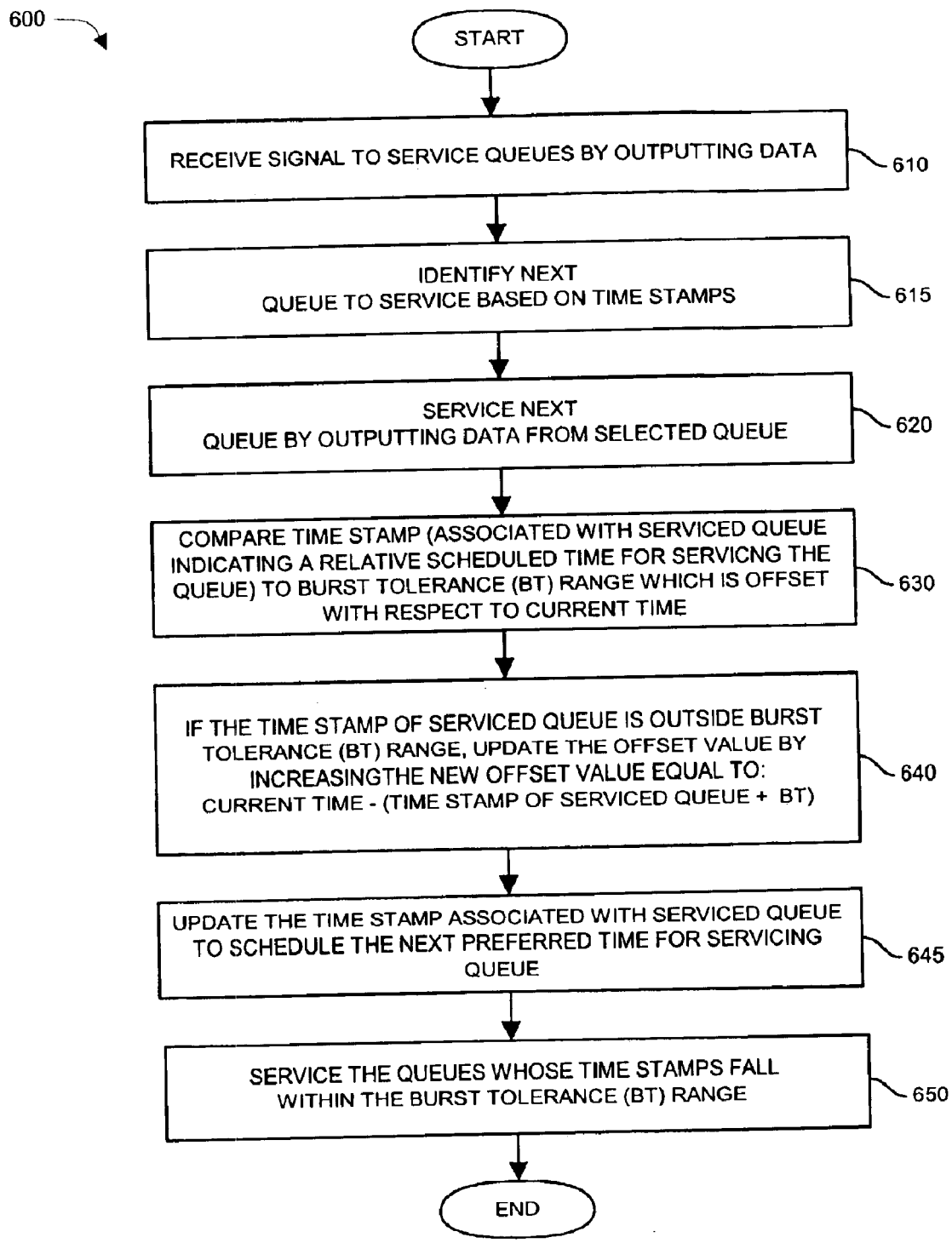
FIG. 6 is a flowchart illustrating another method of maintaining and monitoring an output of data information form one or more queues as depicted in FIG. 5.

FIG. 6 is a flow chart 600 illustrating a method of limiting rates of outputting data from queues 120.

In step 610, processor device 250 receives a signal that queues 120 need to be serviced by outputting data.

In step 615, ordering circuit 265 identifies an order for servicing queues 120 based on a value of corresponding time stamps 140.

In step 620, the selected queue 120 is serviced by outputting data.

In step 630, queue manager 330 compares a value of time stamp to the burst tolerance range.

In step 640, if the time stamp 140 of the serviced queue 120 is outside the burst tolerance (BT) range, offset value 270 is updated so that a time stamp 140 of the next queue in line for servicing falls within or at an edge of burst tolerance range. As mentioned, in one application, a displacement (via offset value 270) of moving time reference, Tref, only increases over time. In other words, queues 120 are infrequently serviced so that offset value 270 either increases or remains constant over time.

In step 645, if a queue 120 is to be serviced, the time stamp 140 associated with the serviced queue 120 is advanced to a next virtual time value for servicing the queue 120.

In step 650, all queues 120 with corresponding time stamps 140 that fall within the burst tolerance range are serviced.

The aforementioned techniques for monitoring and maintaining queues is beneficial over conventional techniques. Consider that management of a single queue requires a certain amount of resources such as processor time and memory to track its rate of output. In applications in which thousands of queues are managed, proportionally more resources are required to track an output of data from the queues. The simple monitoring circuit employs minimal resources to monitor performance of queues 120. Additionally, the monitoring circuit enforces peak rate limits of data flows with infinite tolerance to congestion and under-servicing. Comparatively, conventional systems that enforce peak rate limits must use either a second time stamp or token bucket per queue and are intolerant of over-commitment or under-servicing.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a device that services one or more queues, a method for monitoring performance of the device, the method comprising:

advancing a moving time reference with respect to a clock, the moving time reference displaced with respect to a current time of the clock by an offset value;

in response to outputting data from a selected queue, advancing a value of a time stamp associated with the selected queue; and at times, adjusting the offset value so that the moving time reference and a value of the time stamp advance in relation to each other.

2. A method as in claim 1, wherein adjusting the offset value includes:

if the time stamp is outside a range with respect to the moving time reference at a time of servicing the selected queue, setting the offset value substantially equal to a difference between the time stamp and current time of the clock.

3. A method as in claim 1, wherein adjusting the offset value includes:

performing an operation that (i) increases the offset value when the moving time reference leads a value of the time stamp, and (ii) decreases the offset value when the moving time reference lags behind a value of the time stamp.

4. A method as in claim 3 further comprising:

generating a notification signal indicating (i) a decrease in device performance when the offset value increases, and (ii) an increase in device performance when the offset-value decreases.

5. A method as in claim 1 further comprising:

maintaining a time stamp for each of multiple queues; and prioritizing the queues for servicing based on a comparison of the time stamps associated with the multiple queues.

6. A method as in claim 1 further comprising:

when servicing the selected queue, generating a comparison result based on a comparison between a time stamp for the queue and the moving time reference; and maintaining the offset value when the comparison result indicates that the time stamp for the selected queue is within a range of the moving time reference to indicate that the device is maintaining current performance, and adjusting the offset value when the comparison result indicates that the time stamp for the queue falls outside a range with respect to the moving time reference to indicate a change in device performance.

7. A method as in claim 1, wherein the step of advancing a value of the time stamp includes:

based on an expected rate of outputting data from the selected queue and an actual amount of data output from the selected queue as a result of servicing, updating the time stamp to a next scheduled relative time for servicing the queue.

8. A method as in claim 7, wherein the step of updating the time stamp includes:

updating the time stamp by adding a calculated quantity to the present time stamp, the calculated quantity being equal to the actual amount of data outputted from the queue at a time of servicing divided by the expected rate of outputting data from the queue.

9. A method as in claim 1 further comprising:

comparing the offset value as updated at successive times of servicing the one or more queues to quantify a performance of outputting data from the queues over time.

10. A method as in claim 1 further comprising:

servicing the queues at a peak rate so that the offset value never decreases and, as a result, an output of data from any particular queue does not exceed an expected output rate.

11. An apparatus to monitor performance of one or more queues, the apparatus comprising:

a real-time clock to track current time and an advancement of a time reference, the time reference displaced with respect to the current time of the clock by an offset value;

a memory device to store time stamp information associated with the one or more queues, a time stamp associated with a selected queue being advanced in response to outputting data from the selected queue; and a processor device that services the selected queue by outputting data, the processor device adjusting the offset value so that the time reference and a value of the time stamp advance in relation to each other.

12. An apparatus as in claim 11, wherein the time stamp associated with the selected queue is updated each time the queue is successively serviced, the updated time stamp indicating a preferred scheduled relative time for next servicing the queue.

13. An apparatus in claim 12, wherein the time stamp information is used to determine an order associated with servicing multiple queues relative to each other.

14. An apparatus as in claim 12, wherein the time stamp associated with the selected queue is updated to a next preferred scheduled relative time for servicing based on an expected rate of outputting data from the queue and an amount of data output from the queue at a time of servicing.

15. An apparatus as in claim 14, wherein the time stamp of the selected queue is updated to a new value by adding a quantity to the present time stamp, the quantity being equal to the expected rate of outputting data from the queue divided by the outputted packet size from the queue at a time of servicing.

16. An apparatus as in claim 11, wherein the processor device maintains the offset value, at least in part, based on comparing values of the offset value at successive times of servicing the queues to a time difference between the time reference and values of the time stamps at successive times of servicing multiple queues.

17. An apparatus as in claim 11, wherein the offset value is adjusted if the time stamp of the selected queue being serviced is outside a range with respect to the time reference.

18. An apparatus as in claim 17, wherein the offset value is set substantially equal to a difference between the time stamp of the selected queue at a time of servicing and current time of the clock.

19. In a device that services multiple queues, an apparatus that monitors performance of the device, the apparatus comprising:

a real-time clock that keeps track of current time;

a memory device to store an offset value, the offset value indicating a relative offset in time of a moving time range with respect to the real-time clock;

a scheduler that maintains time stamps associated with the queues, the scheduler advancing values of the time stamps associated with queues as they are serviced by outputting data;

an ordering circuit that compares values of the time stamps to identify a relative order for servicing the queues; and a processor device that generates at least one comparison result based on a comparison of a time stamp associated with a queue selected for servicing and the moving time range, the processor adjusting the stored offset value if the time stamp associated with the selected queue falls outside the moving time range.

20. An apparatus as in claim 19, wherein the processor services a queue only if its corresponding time stamp lags behind a value of the current time less the offset value.

21. An apparatus as in claim 20, wherein the processor device, when allotted processor time for servicing the queues, compares a time stamp of a next queue for servicing to the moving time range and, if the time stamp of the next queue for servicing is within the moving time range, the processor device servicing the next queue and other queues having time stamps that also fall within the moving range.

22. An apparatus as in claim 20, wherein the processor device, when allotted processor time for servicing the queues, compares a time stamp of the next queue for servicing to the moving time range and, if the time stamp of the next queue for servicing is outside of the moving time range, the processor device increasing the offset value so that the time stamp of the next queue for servicing falls within the moving time range.

23. An apparatus as in claim 22, wherein the processor, after increasing the offset value, services all queues with corresponding time stamps within the updated moving time range.

24. A method as in claim 23, wherein the value of the offset is increased to equal: current time less a value of the time stamp associated with the next queue for servicing plus a width of the moving time range.

25. An apparatus as in claim 19, wherein the processor adjusts a width of the moving range to change a burst tolerance associated with outputting data from multiple queues.

26. An apparatus as in claim 19, wherein the processor only services queues with time stamps that fall within the moving range and the offset value is adjusted so that at least one of the queues being successively serviced by the processor does not exceed a specified rate of outputting data.

27. An apparatus to monitor an output of data information, the apparatus comprising:

a queue to store data information for later transmission;

a real-time clock to track current time;

a memory device to store track a time stamp associated with the queue, the time stamp indicating a scheduled time with respect to the real-time clock for servicing the queue; and a processor device that services the queue at successive times by outputting data information stored in the queue, the processor device maintaining a metric that indicates a relative time difference between the real-time clock and the time stamp associated with the queue to detect a change in a rate of outputting data information from the queue over time.

28. In a data communications device including at least one queue, a system for tracking a relative rate of outputting data from a queue comprising:

a queue that stores data information for later transmission;

a processor that services the queue by outputting data information stored in the queue;

a memory device to store a time stamp associated with the queue, the time stamp being incremented each time the queue is successively serviced, an amount of incrementing the time stamp depending on an amount of data information outputted from the queue and an expected throughput rate of the queue; and means for tracking changes in a relative time difference between a real-time clock and the successively incremented time stamp of the queue to detect changes in a rate of outputting data information from the queue over time.

29. A computer program product including a computer-readable medium having instructions stored thereon for processing data information, such that the instructions, when carried out by a processing device, enable the processing device to perform the steps of:

storing data information in a queue for later transmission;

servicing the queue by outputting data information stored in the queue;

advancing a time stamp associated with the queue each time the queue is successively serviced, an amount of advancing the time stamp depending on an amount of data information outputted from the queue and an expected throughput rate of the queue; and tracking changes in a relative time difference between current time of a real-time clock and the successively incremented time stamp of the queue to detect changes in a rate of outputting data information from the queue over time.

\* \* \* \* \*